United States Patent

Bonenberger et al.

Patent Number: 5,285,877
Date of Patent: Feb. 15, 1994

[54] IMPACT DAMPER

[75] Inventors: Hartmut Bonenberger, Puchheim-Nord; Holger Kirchner, Ruppichteroth; Kurt Wagner, Gröbenzell, all of Fed. Rep. of Germany

[73] Assignee: Boge Aktiengesellschaft, Eitorf, Fed. Rep. of Germany

[21] Appl. No.: 940,914

[22] Filed: Sep. 8, 1992

Related U.S. Application Data

[63] Continuation of Ser. No. 763,942, Sep. 23, 1991, abandoned.

[30] Foreign Application Priority Data

Sep. 22, 1990 [DE] Fed. Rep. of Germany ....... 4030033

[51] Int. Cl.$^5$ ............................ F16F 9/06; B60R 19/32
[52] U.S. Cl. ...................................... 188/314; 188/299; 293/134
[58] Field of Search ............... 267/64.12, 64.15, 64.26, 267/116; 188/269, 314; 293/118, 119, 134

[56] References Cited

U.S. PATENT DOCUMENTS

| | | | |
|---|---|---|---|
| 3,001,782 | 9/1961 | Gaebler | 267/11 |
| 3,415,159 | 10/1968 | Hornlein et al. | 91/5 |
| 3,804,443 | 4/1974 | Komatsu | 267/116 X |
| 4,474,257 | 10/1984 | Lee | 293/118 X |
| 4,506,869 | 3/1985 | Masclet et al. | 267/64.15 |
| 4,518,183 | 5/1985 | Lee | 293/134 X |
| 4,641,872 | 2/1987 | Löhr et al. | 293/133 |
| 4,719,941 | 1/1988 | Moser | 137/599 |
| 4,784,375 | 11/1988 | Wirges | 267/64.12 |
| 4,826,207 | 5/1989 | Yoshioka et al. | 188/319 X |
| 4,893,699 | 1/1990 | Engelsdorf et al. | 188/319 X |
| 5,096,242 | 3/1992 | Chin-Hun | 293/134 X |

FOREIGN PATENT DOCUMENTS

| | | |
|---|---|---|
| 3419165 | 11/1985 | Fed. Rep. of Germany . |
| 5331545 | 6/1974 | Japan . |
| 63-301115 | 12/1988 | Japan . |
| 1-33262 | 5/1990 | Japan ................. 293/118 |
| 475417 | 11/1937 | United Kingdom . |

Primary Examiner—Robert J. Oberleitner
Assistant Examiner—Chris Schwartz
Attorney, Agent, or Firm—Nils H. Ljungman & Associates

[57] ABSTRACT

Impact damper for motor vehicles, the impact damper having two tubes which can be pushed one inside the other, the inner tube consisting of a first and second fluid chamber and a gas chamber separated from the first fluid chamber by a separating piston. A third fluid chamber, separated from the second fluid chamber by a work piston can extend the tubes relative to one another by changing the pressure within the fluid chambers.

14 Claims, 2 Drawing Sheets

IMPACT DAMPER

This application is a continuation of U.S. application Ser. No. 07/763,942, filed on Sep. 23, 1991 now abandoned.

BACKGROUND OF THE INVENTION

1. Field of the Invention

This invention relates to an impact damper having two tubes slidable one about the other such that one of the tubes can be pushed into the other tube. In particular, such an impact damper is used in a motor vehicle to slow down the motor vehicle upon collision of the motor vehicle with an obstacle. Such an impact damper works by means of hydraulic damping forces and pneumatic spring forces. The inner tube of the impact damper is closed by a bottom, or base, and essentially contains, in sequence starting from the bottom, a gas chamber which holds a gas cushion at high pressure, a separating piston guided tightly and movably within the inner tube, a first fluid chamber, a partition defined within the inner tube and having a throttle opening, a second fluid chamber in communication with the first fluid chamber via the throttle opening, and a work piston which is connected via a piston rod to the outer tube, which outer tube is slidably movable and guided about the inner tube.

2. Background of the Invention

Known impact dampers, for example, the impact damper as disclosed by DE-PS 34 19 165, which corresponds to U.S. Pat. No. 4,641,872, generally can have two tubes which are slidably movable one inside of the other. Of the two tubes, the sealed inner tube of the impact damper of DE-PS 34 19 165 includes, in sequence starting from the bottom, a gas chamber containing a high pressure gas cushion, a separating piston guided so that it can move in a sealed manner within the inner tube, and a first fluid chamber connected via a throttle to a second fluid chamber. The first fluid chamber being used to generate hydraulic damping forces. With such an impact damper, the maximum stroke of the piston is essentially large enough to absorb the energy of a collision impact at vehicle speeds of up to about 8 km/h. The expansion equalization and the return of the impact damper into its base position is accomplished by means of the gas cushion which is contained in the closed gas chamber.

OBJECT OF THE INVENTION

The object of the invention is to improve an impact damper so that, starting from a normal or base configuration, the tubes can be axially extended relative to one another under certain specified conditions to provide an extended configuration, such that the desired damping and deformability of the impact damper can be achieved both in the base configuration and also in the extended configuration.

SUMMARY OF THE INVENTION

This object is achieved by the invention in that, on the side of the work piston opposite the second fluid chamber, there is provided a third fluid chamber, which can preferably be connected by means of a control, such as a valve, to the second fluid chamber. With the tubes of the impact damper in the base configuration, when the connection between the third fluid chamber and the second fluid chamber is opened, the outer tube is preferably pushed axially a defined distance relative to the inner tube.

One advantage here is that by means of the control valve, the third fluid chamber experiences a pressure decrease, thus allowing the impact damper to be moved from the normal configuration into the extended configuration, which extended configuration may have, for example, an axial extension of about 100 mm as compared to the base configuration. The additional stroke length provided by such an extension advantageously increases the effective performance of the impact damper. The maximum impact damper stroke length of the extended impact damper is increased to an extent which makes it possible to absorb collision energies which occur in the event of collision speeds of up to about 15 km/h.

It is also advantageous that, when the flow connection is opened by the control valve, the pressure of the gas chamber is propagated throughout the system, so that, on account of the different surface areas of the work piston, the impact damper preferably assumes its extended configuration after the same pressure is established between the second and third fluid chambers. It is important that the second fluid chamber pressurizes the entire end surface of its corresponding end surface of the work piston, and that the third fluid chamber pressurizes only the end surface of the work piston, minus the cross section of the piston rod at its corresponding end surface of the work piston.

In one embodiment of the invention, when the work piston is in a retracted configuration, the second and third fluid chambers are preferably connected, in the vicinity of the work piston, by grooves in the wall of the inner tube. In this case, the fluid exchange preferably takes place from the retracted configuration, so that the base configuration is established by means of the various pressure relationships among the various chambers.

In one additional embodiment, there is also preferably provided a damping valve between the second and third fluid chamber. As a result of such a damping valve, it becomes advantageously possible to obtain a uniform damping force characteristic for the impact damper.

One feature of the invention resides broadly in an impact damper comprising two tubes slidable one about the other, the inner tube of the impact damper comprising, in sequence starting from the base, a gas chamber containing a gas cushion at high pressure, a separating piston guided tightly and movably within the inner tube, a first fluid chamber separated from the gas cushion by the separating piston, a partition located within the inner tube and equipped with at least one throttle opening, a second fluid chamber in communication with the first fluid chamber via the throttle opening and a work piston which is connected to an outer tube, which outer tube is guided so that it moves about the inner tube. The impact damper is characterized by the fact that on the side of the work piston opposite the second fluid chamber, there is a third fluid chamber, which can be placed in communication, by means of a control valve, with the second fluid chamber, and starting from a base configuration, when the communication is opened between the third fluid chamber and the second fluid chamber, the outer tube is pushed axially along the inner tube a defined axial distance.

BRIEF DESCRIPTION OF THE DRAWINGS

The preferred embodiments of the invention are schematically illustrated in the accompanying drawings, in which.

DESCRIPTION OF THE PREFERRED EMBODIMENTS

Figure 1:
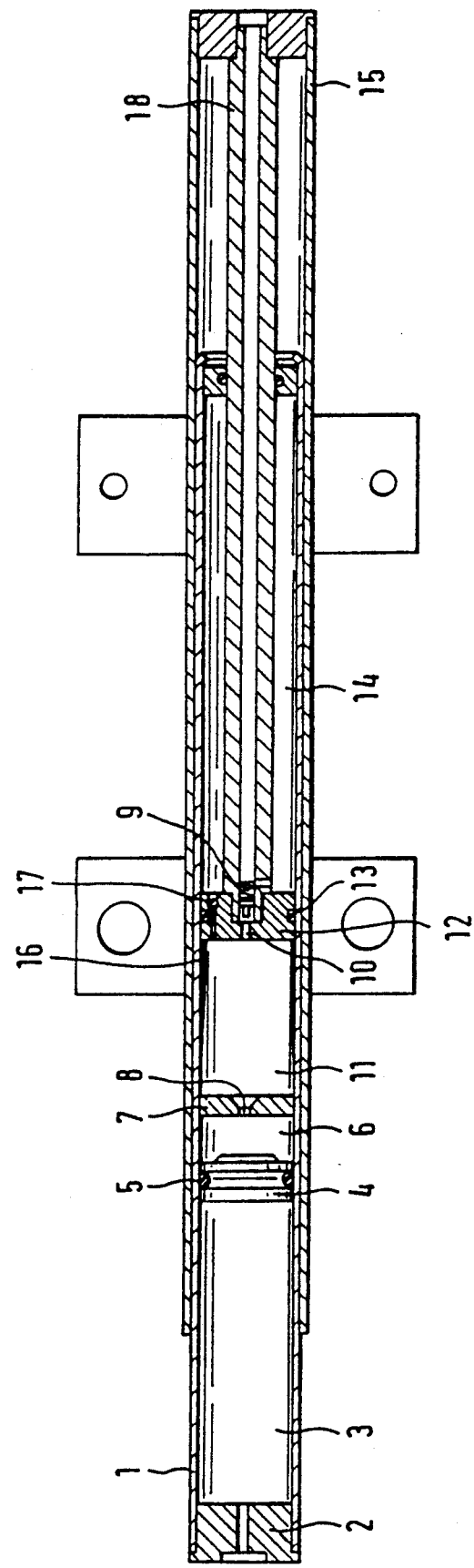
FIG. 1 shows one embodiment of an impact damper in axial longitudinal section, in which the control between the second and third fluid chamber is exercised by means of a piston rod.

The impact damper illustrated in FIG. 1 has an inner tube 1 closed by a bottom 2. In sequence starting from the bottom 2, there is preferably a gas chamber 3 enclosing a gas cushion at high pressure, a separating piston guided tightly and movably within the inner tube 1 by means of a gasket 5, a first fluid chamber 6, and a partition 7 in the inner tube 1,, which partition has a throttle opening 8. The inner tube 1, also preferably has a second fluid chamber 11 and a work piston 12, which work piston 12 is sealed by a gasket 13 against the inner jacket of the inner wall of tube 1, and which work piston is guided within the inner tube 1 to be movable within the inner tube 1. The work piston 12 is preferably permanently connected via the piston rod 18 to the outer tube 15.

On the side of the work piston 12 opposite the second fluid chamber 11, there is preferably a third fluid chamber 14, which can preferably be connected to the second fluid chamber 11 by means of a flow connection 10 having a flow valve 9 which may possibly be an electromagnetic or solenoid valve. After the control valve 9 is opened, on account of the the gas cushion of the gas chamber 3, an identical pressure level is preferably established within the first fluid chamber 6, the second fluid chamber 11 and the third fluid chamber 14. As a result of the pressure forces acting on the different end surfaces of the work piston 12 in the second fluid chamber 11 and in the third fluid chamber 14, the work piston 12 is preferably pushed outward. Thus, the work piston 12 preferably moves into its extended configuration, which is desirable, for example, as a function of the speed of a vehicle or when the vehicle is too close to a vehicle travelling ahead of it.

Figure 2:
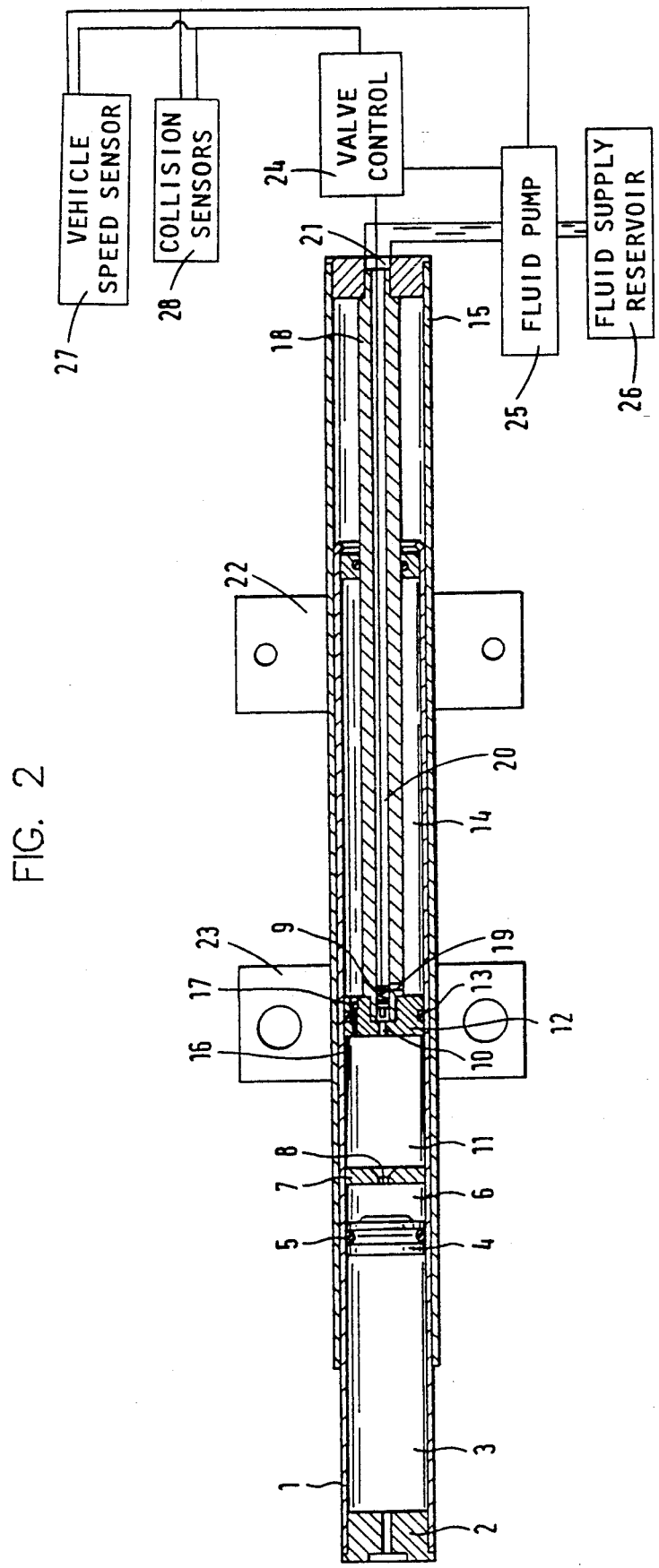
FIG. 2 shows a similar axial longitudinal section of an impact damper which includes one possible control system for control of pressure within the chambers of the impact damper.

FIG. 2 shows one possible embodiment of the invention having a control system for control of the fluid pressures within the fluid chambers. The impact damper preferably has mounting brackets 22 and 23 for permanently mounting the impact damper to the frame of a motor vehicle. Preferably, there is also provided on the motor vehicle, a control system for adjusting the impact damper to extend the tubes as required by the driving conditions. Preferably, a valve control 24 opens or closes the valve 9 to allow fluid movement between the fluid chambers 11 and 14. There may also preferably be a fluid supply reservoir 26 for supplying additional fluid to the chambers 11 and 14. This fluid reservoir can preferably be connected to the impact damper at opening 21, through which opening the fluid is pumped by pump 25. The opening 21 essentially allows fluid to flow through piston rod 18 along passage 20 to the fluid chambers 11 and 14. Orifice 19 in the piston rod 18 allows fluid communication between the third fluid chamber 14 and the passage 20 of the piston rod 18. Therefore, when valve 9 is open, there is essentially fluid communication between each of the fluid chambers 11 and 14 with the fluid supply 26. Such a configuration, as shown in FIG.,2, preferably allows the fluid pressure within each of the chambers to be controlled to thereby change the configuration of the tubes, i.e. to either extend or retract the tubes relative to one another as driving conditions require.

It can also be possible for the control system to be automated by preferably providing the motor vehicle with a speed sensor 27 for monitoring the vehicle speed, and/or possibly a distance, or collision sensor 28 for monitoring the distance between the motor vehicle and an obstacle, i.e. another motor vehicle which is travelling in front of the vehicle. Such sensors could send signals to the valve control and fluid supply to thereby automatically adjust the relative extension of the tubes of the impact damper. Therefore, when the motor vehicle speeds up, or approaches another vehicle, the tubes of the impact damper can preferably be automatically extended to extend the bumper of the motor vehicle to prepare the motor vehicle for a collision. When the speed of the motor vehicle is reduced, or the obstacle is removed from in front of the vehicle, the tubes can preferably be automatically retracted back to the base configuration.

One aspect of the invention resides broadly in an impact damper with two tubes which can be pushed one into the other, in particular for motor vehicles, to slow down a vehicle colliding with an obstacle by hydraulic damping forces and pneumatic spring forces, in which an inner tube contains, in sequence starting from the bottom, a gas chamber containing a gas cushion at high pressure, a separating piston guided tightly and movably within the inner tube, a first fluid chamber, a partition located within the inner tube and equipped with throttle openings, a second fluid chamber and a work piston which is connected to an outer tube guided so that it moves on the inner tube, characterized by the fact that on the side of the work piston 12 opposite the second fluid chamber 11, there is a third fluid chamber 14, which can be placed in communication by means of a control with the second fluid chamber 11, and starting from a base configuration, when the communication is opened between the fluid chamber 14 and the second fluid chamber 12, the outer tube 15 is pushed by a defined axial distance out of the inner tube 1.

Another aspect of the invention is an impact damper characterized by the fact that the second 11 and third fluid chamber 14 in the vicinity of the work piston 12, in the retracted configuration, are connected to one another by grooves 16 in the wall of the inner tube 1.

Yet another aspect of the invention is an impact damper characterized by the fact that there is a damping valve 17 between the second 11 and third fluid chamber 14.

One example of a flow control valve can be found in U.S. Pat. No.: 4,719,941 to Moser, entitled "Throttle Valve".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A system for increasing impact absorbtion ability between a motor vehicle and an obstacle, said system comprising:
    a motor vehicle with a bumper and an impact damper disposed between the bumper and the motor vehicle, said impact damper comprising an inner tube and an outer which can be pushed one into the other, said inner tube having a first end disposed away from said outer tube, and said inner tube comprising:
        a work piston, the work piston having a first side disposed towards the first end of said inner tube and a second side opposite the first side;
        a piston rod connecting said work piston to said outer tube,
        a first fluid chamber disposed adjacent the first side of said work piston;
        a second fluid chamber disposed adjacent the second side of said work piston;
        means for pressurizing at least said first fluid chamber;
        electrically controlled control valve means disposed between said first and second fluid chambers for placing said first and second fluid chambers in communication with one another, said control valve means being configured for opening and closing the communication to control flow of fluid between said first and second fluid chambers;
    said impact damper having a base configuration of said inner and outer tubes and an extended configuration of said inner and outer tubes, said inner and outer tubes being configured to be extended from the base configuration, a defined axial distance with respect to one another, into the extended configuration when said communication is opened between the first fluid chamber and the second fluid chamber, said impact damper being configured for adsorbing a first impact energy in the base configuration and a second impact energy in said extended configuration, the second impact energy being greater than the first impact energy;
    means for electrically controlling the control valve means to open and close the communication between the first and second fluid chambers;
    means for electrically operating said means for controlling to extend said impact damper into the extended configuration under predetermined operating conditions of the motor vehicle;
    said impact damper comprises mounting brackets for mounting said impact damper to the motor vehicle;
    a fluid supply reservoir for supplying fluid to said first and second fluid chambers;
    pump means for supplying fluid from the fluid reservoir to said impact damper;
    said outer tube having a first and disposed away from the inner tube;
    said piston rod extending from the second side of said work piston to the first end of said outer tube;
    said piston rod comprising a longitudinal passage extending from said control valve means to the first end of said outer tube;
    said longitudinal passage being configured to be connected to said pump means for passage of fluid therethrough;
    said longitudinal passage further comprising means for electrically connecting said control valve means to said means for controlling said control valve means;
    said means for controlling said control valve means further comprising means for controlling said pump means;
    said impact damper in said base configuration has a first length, said impact damper in said extended configuration has a second length, and said second length is about 100 mm longer than said first length;
    said predetermined speed of the motor vehicle is about 8 km/hr;
    said impact damper in said base configuration is configured for absorbing an impact energy between the motor vehicle and the obstacle at impact speeds of up to about 8 km/hr; and
    said impact damper in said extended configuration is configured for absorbing an impact energy between the motor vehicle and the obstacle at impact speeds of up to about 15 km/hr.

2. The system according to claim 1, wherein said impact damper further comprises damping valve means disposed between the first and second fluid chambers, said damping valve means being configured for providing a uniform damping force characteristic for said impact damper.

3. The system according to claim 2, wherein:
    said means for electrically operating said means for controlling comprises sensor means for sensing at least one of:
        an impending collision of the motor vehicle with the obstacle; and
        an increased speed of the motor vehicle beyond a predetermined speed of the motor vehicle;
    the sensor means for producing a signal upon sensing at least one of:
        an impending collision; and
        an increased speed; and
    said means for electrically controlling being configured for receiving said signal from the sensor means and opening the control valve means upon receipt of said signal.

4. The system according to claim 3, wherein:
    said damping valve means is disposed in said work piston and passes through said work piston from the first side thereof to the second side thereof; and
    said electrically controlled control valve means comprises one of:
        a solenoid valve and an electromagnetic valve.

5. The system according to claim 4, wherein:
    said electrically controlled control valve means being disposed in said piston rod; and said piston rod comprises a first flow passage portion disposed between said electrically controlled control valve means and the second fluid chamber;

the work piston comprises a second flow passage portion disposed between said electrically controlled control valve means and the first fluid chamber; and the communication between the first fluid chamber and the second fluid chamber comprises the first flow passage portion, the electrically controlled control valve means and the second flow passage portion.

6. The system according to claim 5, wherein:

said means for pressuring comprises a gas chamber containing a gas cushion at high pressure; and said impact damper further comprises, in sequence starting from the first end;

said gas chamber containing a gas cushion at high pressure;

a separating piston guided tightly and movably within the inner tube;

a third fluid chamber;

a partition located within the inner tube between said third fluid chamber and first fluid chamber, said partition comprising a throttle opening between said first and third fluid chambers;

said first fluid chamber;

said work piston; and said second fluid chamber.

7. The system according to claim 6, wherein said inner tube comprises an inner wall, the inner wall of the inner tube comprising connecting grooves for connecting said first fluid chamber to said second fluid chamber in the vicinity of said work piston.

8. The system according to claim 1, wherein:

said means for electrically operating said means for controlling comprises sensor means for sensing at least one of:

an impending collision of the motor vehicle with the obstacle; and an increased speed of the motor vehicle beyond a predetermined speed of the motor vehicle;

said sensor means for producing a signal upon sensing at least one of:

an impending collision; and an increased speed; and said means for electrically controlling being configured for receiving said signal from said sensor means and opening the control valve means upon receipt of said signal.

9. The system according to claim 8, wherein:

said inner tube comprises an inner wall, the inner wall of the inner tube comprising connecting grooves for connecting said first fluid chamber to said second fluid chamber in the vicinity of said work piston; and said work piston further comprises damping valve means disposed between the first and second fluid chambers, said damping valve means being configured for providing a uniform damping force characteristic for said impact damper.

10. The system according to claim 9, wherein:

said means for pressurizing comprises a gas chamber containing a gas cushion at high pressure; and said impact damper further comprises, in sequence starting from the first end:

said gas chamber containing a gas cushion at high pressure;

a separating piston guided tightly and movably within the inner tube;

a third fluid chamber;

a partition located within the inner tube between said third fluid chamber and first fluid chamber, said partition comprising a throttle opening between said first and third fluid chambers;

said first fluid chamber;

said work piston; and said second fluid chamber.

11. The system according to claim 1, wherein:

said means for electrically operating said means for controlling comprises sensor means for sensing at least one of:

an impending collision of the motor vehicle with the obstacle; and an increased speed of the motor vehicle beyond a predetermined speed of the motor vehicle;

said sensor means for producing a signal upon sensing at least one of:

an impending collision; and an increased speed;

said means for electrically controlling being configured for receiving said signal from said sensor means and opening the control valve means upon receipt of said signal;

said means for pressurizing comprises a gas chamber containing a gas cushion at high pressure; and said impact damper further comprises, in sequence starting from the first end:

said gas chamber containing a gas cushion at high pressure;

a separating piston guided tightly and movably within the inner tube;

a third fluid chamber;

a partition located within the inner tube between said third fluid chamber and first fluid chamber, said partition comprising a throttle opening between said first and third fluid chambers;

said first fluid chamber;

said work piston; and said second fluid chamber.

12. A system for increasing impact adsorption ability between a motor vehicle and an obstacle, said system comprising:

a motor vehicle with a bumper and an impact damper disposed between the bumper and the motor vehicle, said impact damper comprising an inner tube and an outer tube which can be pushed one into the other, said inner tube having a first end disposed away from said outer tube, and said inner tube comprising:

a work piston, the work piston having a first side disposed towards the first end of said inner tube and a second side opposite the first side;

a piston rod connecting said work piston to said outer tube, a first fluid chamber disposed adjacent the first side of said work piston;

a second fluid chamber disposed adjacent the second side of said work piston;

means for pressurizing at least said first fluid chamber;

electrically controlled control valve means disposed between said first and second fluid chambers for placing said first and second fluid chambers in communication with one another, said control valve means being configured for opening and closing the communication to control flow of fluid between said first and second fluid chambers;

said impact damper having a base configuration of said inner and outer tubes and an extended configuration of said inner and outer tubes, said inner and outer tubes being configured to be extended from the base configuration, a defined axial distance with respect to one another, into the extended configuration when said communication is opened between the first fluid chamber and the second fluid chamber, said impact damper being configured for absorbing a first impact energy in the base configuration and a second impact energy in said extended configuration, the second impact energy being greater than the first impact energy;

means for electrically controlling the control valve means to open and close the communication between the first and second fluid chambers;

means for electrically operating said means for controlling to extend said impact damper into the extended configuration under predetermined operating conditions of the motor vehicle;

said electrically controlled control valve means comprises one of:

a solenoid valve and an electromagnetic valve;

said electrically controlled control valve means being disposed in said piston rod;

said piston rod comprising a first flow passage portion disposed between said electrically controlled control valve means and the second fluid chamber;

the work piston comprising a second flow passage portion disposed between said electrically controlled control valve means and the first fluid chamber;

the communication between the first fluid chamber and the second fluid chamber comprising the first flow passage portion, the electrically controlled control valve means and the second flow passage portion;

said impact damper comprises mounting brackets for mounting said impact damper to the motor vehicle;

p1 a fluid supply reservoir for supplying fluid to said first and second fluid chambers;

pump means for supplying fluid from the fluid reservoir to said impact damper;

said outer tube having a first end disposed away from the inner tube;

said piston rod extending from the second side of said work piston to the first end of said outer tube;

said piston rod comprising a longitudinal passage extending from said control valve means to the first end of said outer tube;

said longitudinal passage being configured to be connected to said pump means for passage of fluid therethrough;

said longitudinal passage further comprising means for electrically connecting said control valve means to said means for controlling said control valve means;

said means for controlling said control valve means further comprising means for controlling said pump means;

said impact damper in said base configuration has a first length, said impact damper in said extended configuration has a second length, and said second length is about 100 mm longer than said first length;

said impact damper in said base configuration is configured for adsorbing an impact energy between the motor vehicle and the obstacle at impact speeds of up to about 8 km/hr; and said impact damper in said extended configuration is configured for adsorbing an impact energy between the motor vehicle and the obstacle at impact speeds of up to about 15 km/hr.

13. The system according to claim 12, wherein said impact damper further comprises damping valve means disposed between the first and second fluid chambers, and damping valve means being configured for providing a uniform damping force characteristic for said impact damper.

14. The system according to claim 13, wherein:

said damping valve means is disposed in said work piston, said damping valve means passing through said work piston from said first side thereof to said second side thereof;

said means for pressurizing comprises a gas chamber containing a gas cushion at high pressure; and said impact damper further comprises, in sequence starting from the first end:

said gas chamber containing a gas cushion at high pressure;

a separating piston guided tightly and movably within the inner tube;

a third fluid chamber;

a partition located within the inner tube between said third fluid chamber and first fluid chamber, said partition comprising a throttle opening between said first and third fluid chambers;

said first fluid chamber;

said work piston; and said second fluid chamber.

* * * * *

UNITED STATES PATENT AND TRADEMARK OFFICE
CERTIFICATE OF CORRECTION

PATENT NO. : 5,285,877
DATED : February 15, 1994
INVENTOR(S) : Hartmut BONENBERGER, Holger KIRCHNER, and Kurt WAGNER It is certified that error appears in the above-indentified patent and that said Letters Patent is hereby corrected as shown below:

In column 5, line 23, Claim 1, after 'outer' insert --tube--.

In column 6, line 5, Claim 1, after 'first' delete "and" and insert --end--.

In column 7, line 14, Claim 6, after 'for' delete "pressuring" and insert --pressurizing--.

In column 8, line 44, Claim 12, after 'impact' delete "adsorption" and insert --absorption--.

In column 9, line 44, Claim 12, before 'a' delete "pl".

In column 10, line 20, Claim 12, after 'for' delete "adsorbing" and insert --absorbing--.

UNITED STATES PATENT AND TRADEMARK OFFICE
CERTIFICATE OF CORRECTION

PATENT NO. : 5,285,877
DATED : February 15, 1994
INVENTOR(S) : Hartmut BONENBERGER, Holger KIRCHNER, and Kurt WAGNER It is certified that error appears in the above-indentified patent and that said Letters Patent is hereby corrected as shown below:

In column 10, line 24, Claim 12, after 'for' delete "adsorbing" and insert --absorbing--.

In column 10, line 30, Claim 13, before 'damping' delete "and" and insert --said--.

Signed and Sealed this

Tenth Day of September, 1996

Attest:

BRUCE LEHMAN

*Attesting Officer*  *Commissioner of Patents and Trademarks*